United States Patent
Chen et al.

(10) Patent No.: US 8,937,906 B2
(45) Date of Patent: Jan. 20, 2015

(54) STRUCTURE OF ENHANCED PHYSICAL DOWNLINK CONTROL CHANNEL (E-PDCCH) IN LONG TERM EVOLUTION (LTE)

(71) Applicant: QUALCOMM Incorporated, San Diego, CA (US)

(72) Inventors: Wanshi Chen, San Diego, CA (US); Peter Gaal, San Diego, CA (US); Yongbin Wei, San Diego, CA (US); Juan Montojo, Nuremberg (DE); Tao Luo, San Diego, CA (US); Hao Xu, San Diego, CA (US); Stefan Geirhofer, San Diego, CA (US); Jelena Damnjanovic, Del Mar, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 91 days.

(21) Appl. No.: 13/665,771

(22) Filed: Oct. 31, 2012

(65) Prior Publication Data

US 2013/0114565 A1    May 9, 2013

Related U.S. Application Data

(60) Provisional application No. 61/556,096, filed on Nov. 4, 2011.

(51) Int. Cl.
*H04Q 7/00* (2006.01)
*H04J 3/16* (2006.01)
*H04L 5/00* (2006.01)

(52) U.S. Cl.
CPC ............. *H04L 5/0053* (2013.01); *H04L 5/0007* (2013.01)

USPC .......................................... 370/328; 370/468

(58) Field of Classification Search
None
See application file for complete search history.

(56) References Cited

U.S. PATENT DOCUMENTS

| 8,238,475 B2 | 8/2012 | Malladi et al. |
| 2011/0170435 A1* | 7/2011 | Kim et al. ..................... 370/252 |

(Continued)

FOREIGN PATENT DOCUMENTS

| EP | 2383928 A2 | 11/2011 |
| WO | 2011137383 A1 | 11/2011 |
| WO | WO2012109542 A1 | 8/2012 |

OTHER PUBLICATIONS

Ericsson et al., "On enhanced PDCCH design", 3GPP Draft; R1-112928, 3rd Generation Partnership Project (3GPP), Mobile Competence Centre; 650, Route Des Lucioles; F-06921 Sophia-Antipolis Cedex; France, vol. RAN WG1, No. Zhuhai; 20111010, Oct. 4, 2011, XP050538137, [retrieved on Oct. 4, 2011].

(Continued)

*Primary Examiner* — Hong Cho
(74) *Attorney, Agent, or Firm* — Patterson & Sheridan, L.L.P.

(57) ABSTRACT

Aspects of the present disclosure relate generally to wireless communication systems, and more particularly, to defining a structure of and enhanced physical downlink control channel (e-PDCCH). Certain aspects provide methods and apparatus for determining a search space in which a base station (eNodeB) may transmit an enhanced physical downlink control channel (e-PDCCH), wherein the search space comprises one or more fractional portions of frequency-time resources of a physical resource block (PRB) pair, and attempting to decode the e-PDCCH based on the determined search space.

72 Claims, 12 Drawing Sheets

(56) References Cited

U.S. PATENT DOCUMENTS

| | | | |
|---|---|---|---|
| 2011/0268062 A1* | 11/2011 | Ji et al. | 370/329 |
| 2011/0274031 A1 | 11/2011 | Gaal et al. | |
| 2012/0051270 A1 | 3/2012 | Chen et al. | |
| 2012/0093063 A1 | 4/2012 | Yuan et al. | |
| 2012/0106465 A1* | 5/2012 | Haghighat et al. | 370/329 |
| 2013/0039291 A1* | 2/2013 | Blankenship et al. | 370/329 |
| 2013/0044693 A1* | 2/2013 | Lindh et al. | 370/329 |
| 2013/0064196 A1* | 3/2013 | Gao et al. | 370/329 |
| 2013/0107822 A1* | 5/2013 | Papasakellariou et al. | 370/329 |

OTHER PUBLICATIONS

Huawei et al., "Investigation on downlink control channel and signalling enhancements", 3GPP Draft; R1-112049-PDCCH Improvements Final, 3rd Generation Partnership Project (3GPP), Mobile Competence Centre; 650, Route Des Lucioles; F-06921 Sophia-Antipolis Cedex; France, vol. RAN WG1, No. Athens, Greece; 20110822, Aug. 16, 2011, XP050537240, [retrieved on Aug. 16, 2011].

International Search Report and Written Opinion—PCT/US2012/062957—ISA/EPO—Jan. 31, 2013.

NEC Group: "DL control channel enhancements for Rel-11", 3GPP Draft; R1-112135, 3rd Generation Partnership Project (3GPP), Mobile Competence Centre; 650, Route Des Lucioles; F-06921 Sophia-Antipolis Cedex; France, vol. RAN WG1, No. Athens, Greece; 20110822, Aug. 16, 2011, XP050537307, [retrieved on Aug. 16, 2011].

Research in Motion et al., "Design Consideration for E-PDCCH", 3GPP Draft; R1-113236(RIM-E-PDCCH Design), 3rd Generation Partnership Project (3GPP), Mobile Competence Centre; 650, Route Des Lucioles; F-06921 Sophia-Antipolis Cedex ; France, vol. RAN WG1, No. Zhuhai; 20111010, Oct. 4, 2011, XP050538352, [retrieved on Oct. 4, 2011].

Samsung: "Discussion on ePDCCH Design Issues", 3GPP Draft; R1-112517 EPDCCH, 3rd Generation Partnership Project (3GPP), Mobile Competence Centre ; 650, Route Des Lucioles ; F-06921 Sophia-Antipolis Cedex ; France, vol. RAN WG1, No. Athens, Greece; 20110822, Aug. 16, 2011, XP050537597, [retrieved on Aug. 16, 2011].

Samsung: "R-PDCCH design", 3GPP Draft, R1-102218, 3rd Generation Partnership Project (3GPP), Mobile Competence Centre, 650, Route Des Lucioles, F-06921 Sophia-Antipolis Cedex, France, vol. RAN WG1, No. Beijing, china, 20100412, Apr. 6, 2010, XP050419487, [retrieved on Apr. 6, 2010].

* cited by examiner

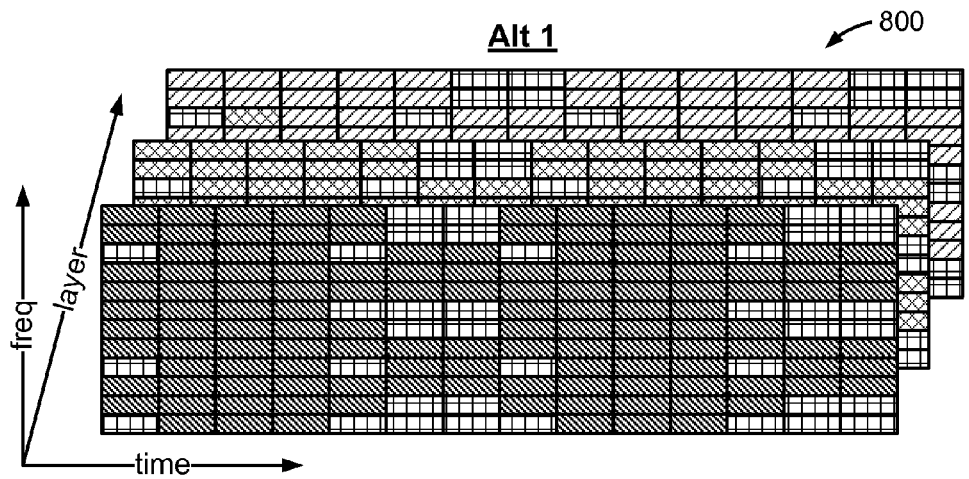
FIG. 8
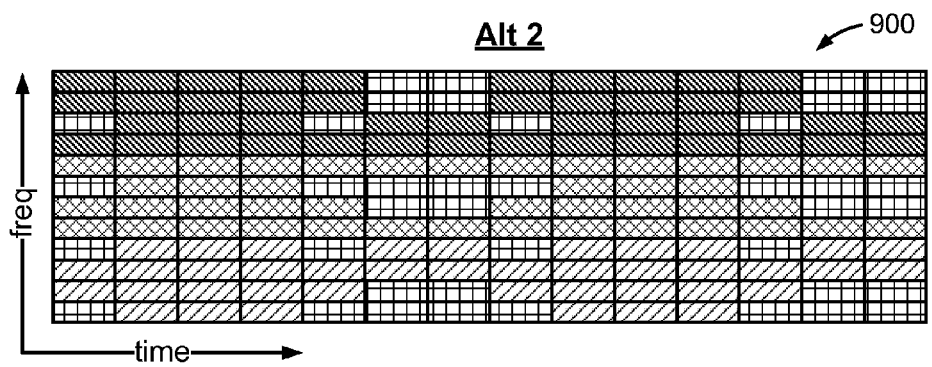
FIG. 9
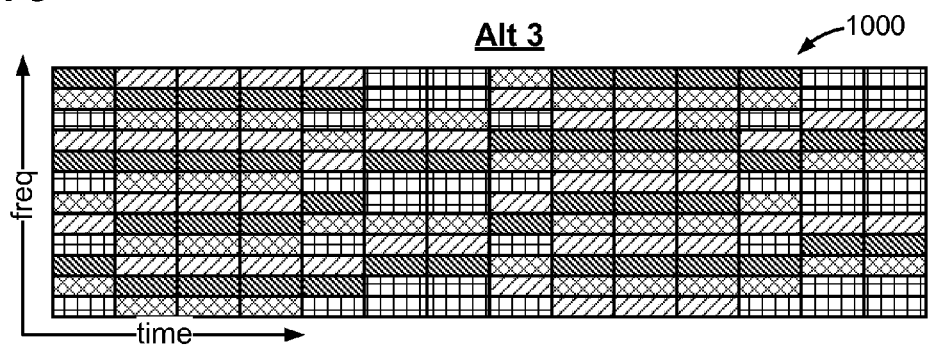
FIG. 10
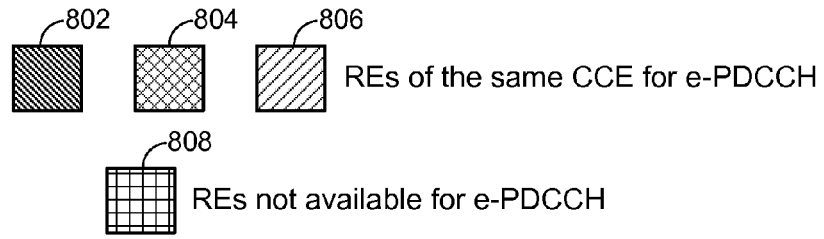

STRUCTURE OF ENHANCED PHYSICAL DOWNLINK CONTROL CHANNEL (E-PDCCH) IN LONG TERM EVOLUTION (LTE)

CROSS-REFERENCE TO RELATED APPLICATIONS

This application claims benefit of U.S. Provisional Patent Application Ser. No. 61/556,096, entitled "STRUCTURE OF ENHANCED PHYSICAL DOWNLINK CONTROL CHANNEL (E-PDCCH) IN LONG TERM EVOLUTION (LTE)", filed Nov. 4, 2011, which is herein incorporated by reference in its entirety.

BACKGROUND

1. Field

Aspects of the present disclosure relate generally to wireless communication systems, and more particularly, to defining a structure of an enhanced physical downlink control channel (e-PDCCH)

2. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

SUMMARY

Certain aspects of the present disclosure provide a method for wireless communications. The method generally includes determining a search space in which a base station may transmit an enhanced physical downlink control channel (e-PDCCH), wherein the search space comprises one or more fractional portions of frequency-time resources of a physical resource block (PRB) pair and attempting to decode the e-PDCCH based on the determined search space.

Certain aspects of the present disclosure provide a method for wireless communications. The method generally includes determining a search space of resources available for transmitting an enhanced physical downlink control channel (e-PDCCH), wherein the search space comprises one or more fractional portions of frequency-time resources of a physical resource block (PRB) pair, and transmitting the e-PDCCH utilizing resources of the determined search space.

Certain aspects of the present disclosure provide an apparatus for wireless communications. The apparatus generally includes means for determining a search space in which a base station may transmit an enhanced physical downlink control channel (e-PDCCH), wherein the search space comprises one or more fractional portions of frequency-time resources of a physical resource block (PRB) pair and means for attempting to decode the e-PDCCH based on the determined search space.

Certain aspects of the present disclosure provide an apparatus for wireless communications. The apparatus generally includes means for determining a search space of resources available for transmitting an enhanced physical downlink control channel (e-PDCCH), wherein the search space comprises one or more fractional portions of frequency-time resources of a physical resource block (PRB) pair, and means for transmitting the e-PDCCH utilizing resources of the determined search space.

Certain aspects of the present disclosure provide an apparatus for wireless communications. The apparatus generally includes at least one processor and a memory coupled to the at least one processor. The at least one processor is generally configured to determine a search space in which a base station may transmit an enhanced physical downlink control channel (e-PDCCH), wherein the search space comprises one or more fractional portions of frequency-time resources of a physical resource block (PRB) pair and attempt to decode the e-PDCCH based on the determined search space.

Certain aspects of the present disclosure provide an apparatus for wireless communications. The apparatus generally includes at least one processor and a memory coupled to the at least one processor. The at least one processor is generally configured to determine a search space of resources available for transmitting an enhanced physical downlink control channel (e-PDCCH), wherein the search space comprises one or more fractional portions of frequency-time resources of a physical resource block (PRB) pair, and transmit the e-PDCCH utilizing resources of the determined search space.

Certain aspects of the present disclosure provide a computer-program product for wireless communications is provided. The computer-program product generally includes a non-transitory computer-readable medium having code stored thereon. The code is generally executable by one or more processors for determining a search space in which a base station may transmit an enhanced physical downlink control channel (e-PDCCH), wherein the search space comprises one or more fractional portions of frequency-time resources of a physical resource block (PRB) pair and attempting to decode the e-PDCCH based on the determined search space.

Certain aspects of the present disclosure provide a computer-program product for wireless communications is provided. The computer-program product generally includes a non-transitory computer-readable medium having code stored thereon. The code is generally executable by one or more processors for determining a search space of resources available for transmitting an enhanced physical downlink control channel (e-PDCCH), wherein the search space comprises one or more fractional portions of frequency-time resources of a physical resource block (PRB) pair, and transmitting the e-PDCCH utilizing resources of the determined search space.

BRIEF DESCRIPTION OF THE DRAWINGS

FIG. 8 illustrates finer resource granularity for e-PDCCH according to a MU-MIMO design, in accordance with aspects of the present disclosure.

FIG. 9 illustrates finer resource granularity for e-PDCCH using consecutive tones, in accordance with aspects of the present disclosure.

FIG. 10 illustrates finer resource granularity for e-PDCCH using interleaving, in accordance with aspects of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
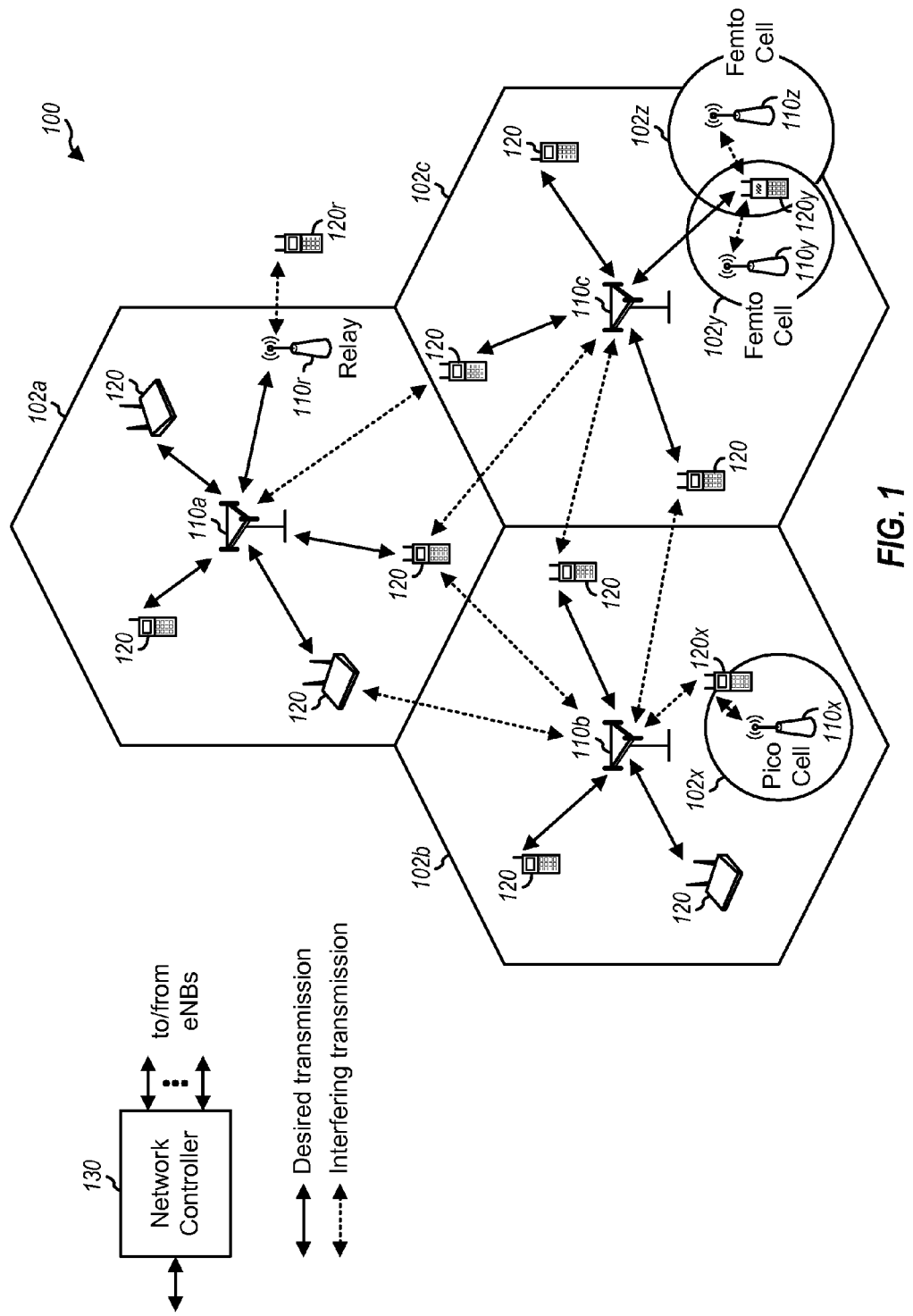
FIG. 1 is a block diagram conceptually illustrating an example of a telecommunications system, in accordance with aspects of the present disclosure.

FIG. 1 shows a wireless communication network 100, which may be an LTE network. The wireless network 100 may include a number of evolved Node Bs (eNodeBs) 110 and other network entities. An eNodeB may be a station that communicates with the UEs 120 and may also be referred to as a base station, an access point, etc. A Node B is another example of a station that communicates with the UEs.

Each eNodeB 110 may provide communication coverage for a particular geographic area. In 3GPP, the term "cell" can refer to a coverage area of an eNodeB 110 and/or an eNodeB subsystem serving this coverage area, depending on the context in which the term is used.

An eNodeB may provide communication coverage for a macro cell 102a, 102b, 103c, a pico cell 102x, a femto cell 102y, 102z, and/or other types of cell. A macro cell 102a may cover a relatively large geographic area (e.g., several kilometers in radius) and may allow unrestricted access by UEs 120 with service subscription. A pico cell 102x may cover a relatively small geographic area and may allow unrestricted access by UEs 120 with service subscription. A femto cell 102y, 102z may cover a relatively small geographic area (e.g., a home) and may allow restricted access by UEs 120 having association with the femto cell 102y, 102z (e.g., UEs in a Closed Subscriber Group (CSG), UEs for users in the home, etc.). An eNodeB for a macro cell may be referred to as a macro eNodeB. An eNodeB for a pico cell may be referred to as a pico eNodeB. An eNodeB for a femto cell may be referred to as a femto eNodeB or a home eNodeB. In the example shown in FIG. 1, the eNodeBs 110a, 110b and 110c may be macro eNodeBs for the macro cells 102a, 102b, and 102c, respectively. The eNodeB 110x may be a pico eNodeB for a pico cell 102x. The eNodeBs 110y and 110z may be femto eNodeBs for the femto cells 102y and 102z, respectively. An eNodeB may support one or multiple (e.g., three) cells.

The wireless network 100 may also include relay stations. A relay station is a station that receives a transmission of data and/or other information from an upstream station (e.g., an eNodeB or a UE) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

The wireless network 100 may support synchronous or asynchronous operation. For synchronous operation, the eNodeBs may have similar frame timing, and transmissions from different eNodeBs may be approximately aligned in time. For asynchronous operation, the eNodeBs may have different frame timing, and transmissions from different eNodeBs may not be aligned in time. The techniques described herein may be used for both synchronous and asynchronous operation.

A network controller 130 may couple to a set of eNodeBs 110 and provide coordination and control for these eNodeBs. The network controller 130 may communicate with the eNodeBs 110 via a backhaul. The eNodeBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, etc. A UE may be able to communicate with macro eNodeBs, pico eNodeBs, femto eNodeBs, relays, etc. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

Figure 2:
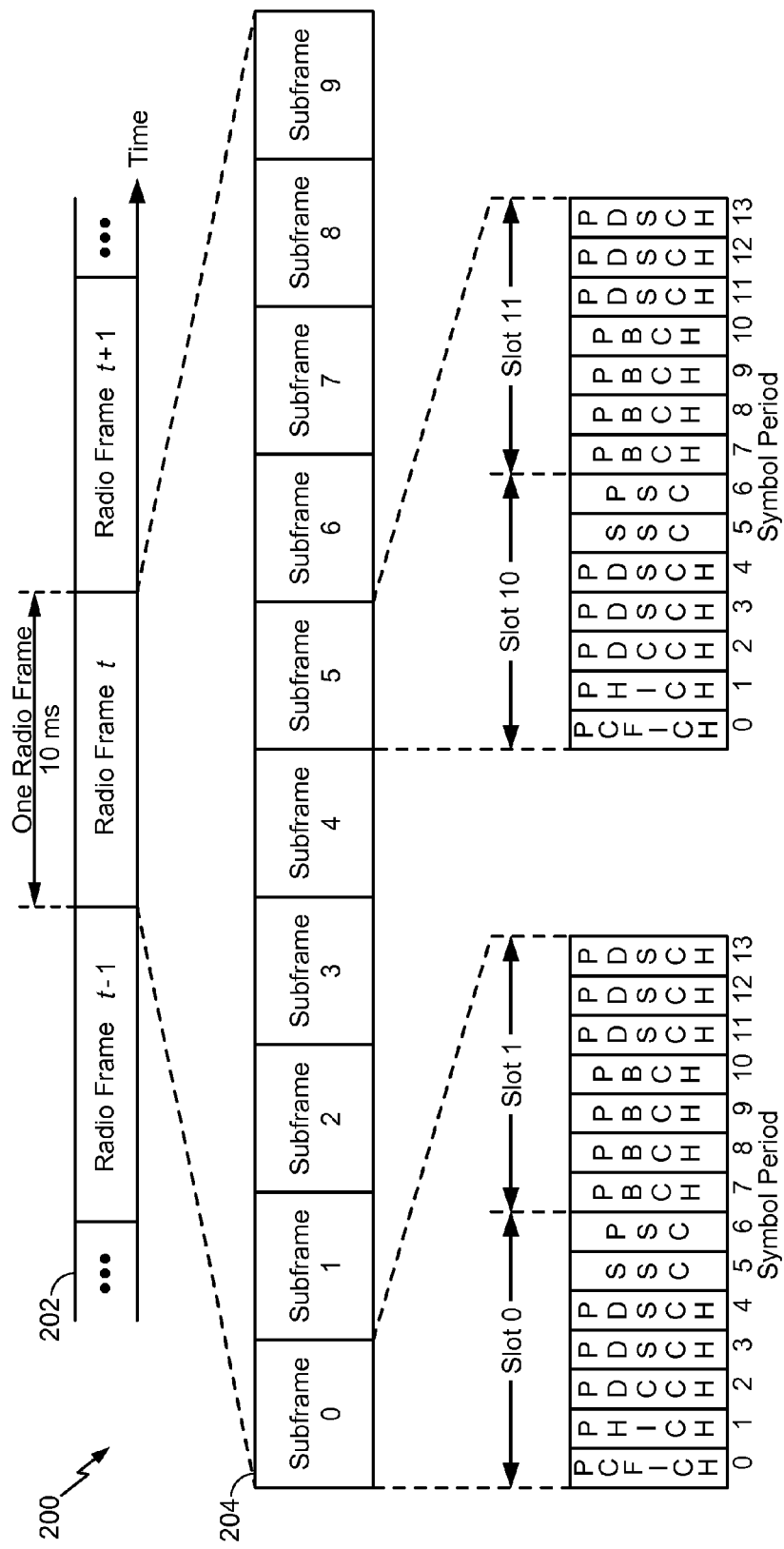
FIG. 2 is a block diagram conceptually illustrating an example of a downlink frame structure in a telecommunications system, in accordance with aspects of the present disclosure.

FIG. 2 shows a downlink frame structure 200 used in LTE. The transmission timeline for the downlink may be partitioned into units of radio frames 202. Each radio frame may have a predetermined duration (e.g., 10 milliseconds (ms)) and may be partitioned into 10 subframes 204 with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 14 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNodeB may send a primary synchronization signal (PSS) and a secondary synchronization signal (SSS) for each cell in the eNodeB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in only a portion of the first symbol period of each subframe, although depicted in the entire first symbol period in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe (M=3 in FIG. 2). The PHICH may carry information to support hybrid automatic retransmission (HARQ). The PDCCH may carry information on uplink and downlink resource allocation for UEs and power control information for uplink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The eNodeB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNodeB may send the PSS, SSS and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to specific UEs in specific portions of the system bandwidth. The eNodeB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
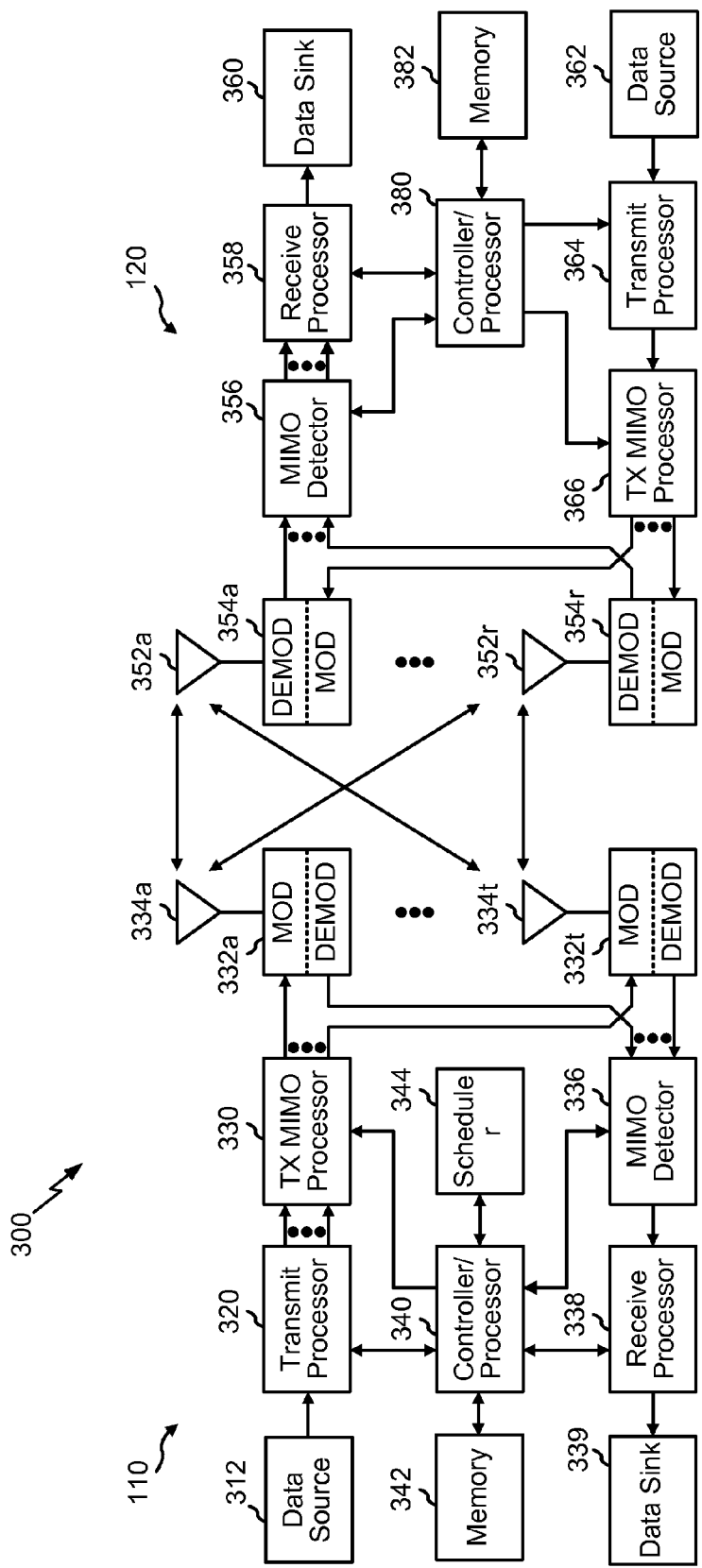
FIG. 3 is a block diagram conceptually illustrating a design of a base station/eNodeB and a UE configured according to an aspect of the present disclosure.

FIG. 3 shows a block diagram 300 of a design of a base station/eNodeB 110 and a UE 120, which may be one of the base stations/eNodeBs and one of the UEs in FIG. 1. For a restricted association scenario, the base station 110 may be the macro eNodeB 110c in FIG. 1, and the UE 120 may be the UE 120y. The base station 110 may also be a base station of some other type. The base station 110 may be equipped with antennas 334a through 334t, and the UE 120 may be equipped with antennas 352a through 352r.

At the base station 110, a transmit processor 320 may receive data from a data source 312 and control information from a controller/processor 340. The control information may be for the PBCH, PCFICH, PHICH, PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 630 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the base station 110 and may provide received signals to the demodulators (DE-MODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The transmit processor 364 may also generate reference symbols for a reference signal. The symbols from the transmit processor 364 may be precoded by a TX MIMO processor 366 if applicable, further processed by the demodulators 354a through 354r (e.g., for SC-FDM, etc.), and transmitted to the base station 110. At the base station 110, the uplink signals from the UE 120 may be received by the antennas 334, processed by the modulators 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340 and 380 may direct the operation at the base station 110 and the UE 120, respectively. The processor 340 and/or other processors and modules at the base station 110 may perform or direct the execution of various processes for the techniques described herein. The processor 380 and/or other processors and modules at the UE 120 may also perform or direct the execution of the illustrations of FIGS. 4A-14 and/or other processes for the techniques described herein. The memories 342 and 382 may store data and program codes for the base station 110 and the UE 120, respectively. A scheduler 344 may schedule UEs for data transmission on the downlink and/or uplink.

In one configuration, the UE 120 for wireless communication includes means for detecting interference from an interfering base station during a connection mode of the UE, means for selecting a yielded resource of the interfering base station, means for obtaining an error rate of a physical downlink control channel on the yielded resource, and means, executable in response to the error rate exceeding a predetermined level, for declaring a radio link failure. In one aspect, the aforementioned means may be the processor(s), the controller/processor 380, the memory 382, the receive processor 358, the MIMO detector 356, the demodulators 354a, and the antennas 352a are configured to perform the functions recited by the aforementioned means. In another aspect, the aforementioned means may be a module or any apparatus configured to perform the functions recited by the aforementioned means.

In one configuration, the UE 120 for wireless communication includes means for determining a search space in which a base station (eNodeB) 110 may transmit an e-PDCCH, wherein the search space comprises a fractional portion of frequency-time resources of a PRB pair and means for attempting to decode the e-PDCCH based on the determined search space. In one aspect, the aforementioned means, which may be the processor(s), the controller/processor 380, the memory 382, the receive processor 358, the MIMO detector 356, the demodulators 354a, and the antennas 352, are configured to perform the recited functions. In another aspect, the aforementioned means may be a module or any apparatus configured to perform the functions recited by the aforementioned means.

In one configuration, the eNodeB 110 for wireless communication includes means for determining a search space of resources available for transmitting an e-PDCCH, wherein the search space comprises a fractional portion of frequency-time resources of a PRB pair, and means for transmitting the e-PDCCH utilizing resources of the determined search space. In one aspect, the aforementioned means, which may be the processor(s), the controller/processor 340, the memory 342, the transmit processor 320, the MIMO processor 330, and the antennas 334, are configured to perform the recited functions. In another aspect, the aforementioned means may be a module or any apparatus configured to perform the functions recited by the aforementioned means.

Carrier Aggregation

LTE-Advanced UEs use spectrum up to 20 Mhz bandwidths allocated in a carrier aggregation of up to a total of 100 Mhz (5 component carriers) used for transmission in each direction. Generally, less traffic is transmitted on the uplink than the downlink, so the uplink spectrum allocation may be smaller than the downlink allocation. For example, if 20 Mhz is assigned to the uplink, the downlink may be assigned 100 Mhz. These asymmetric FDD assignments will conserve spectrum and are a good fit for the typically asymmetric bandwidth utilization by broadband subscribers.

To meet LTE-Advanced requirements, support of transmission bandwidths wider than the 20 MHz is required. One solution is carrier aggregation. Carrier aggregation allows expansion of effective bandwidth delivered to a UE 120 through concurrent utilization of radio resources across multiple carriers. Multiple component carriers are aggregated to form a larger overall transmission bandwidth.

Carrier Aggregation Types

Figure 4A:
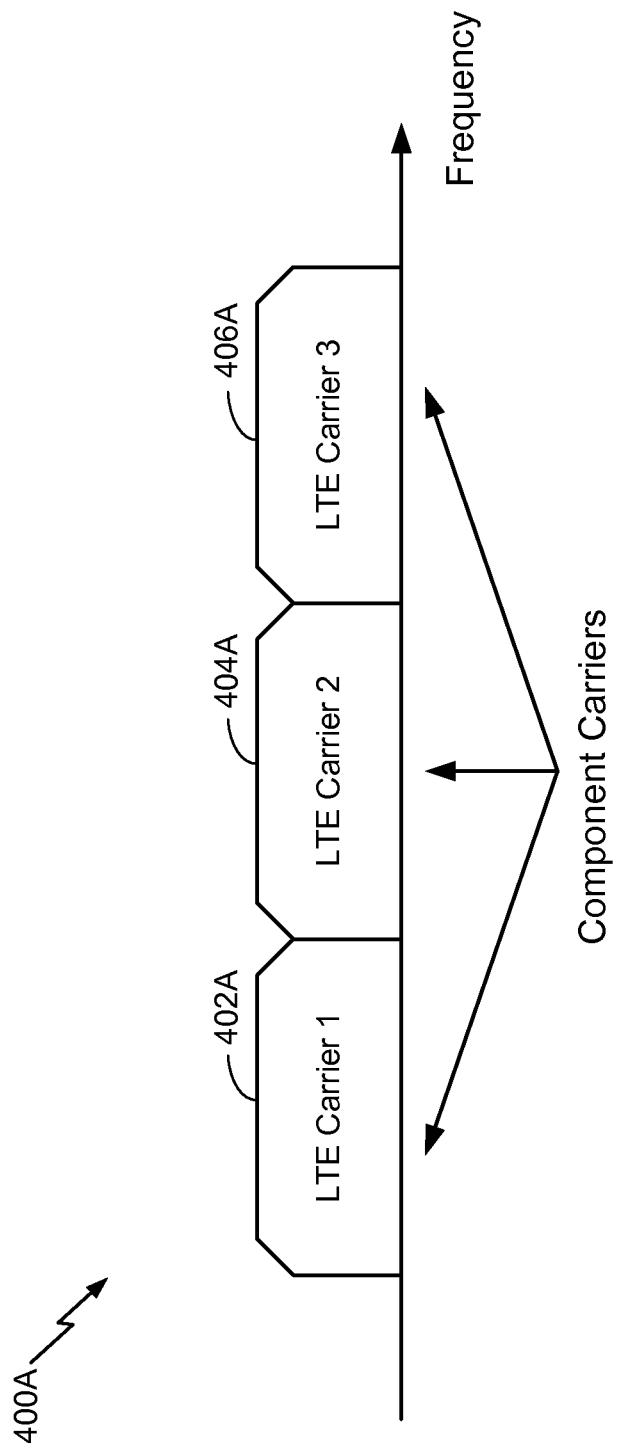
FIG. 4A illustrates a continuous carrier aggregation type, in accordance with aspects of the present disclosure.
Figure 4B:
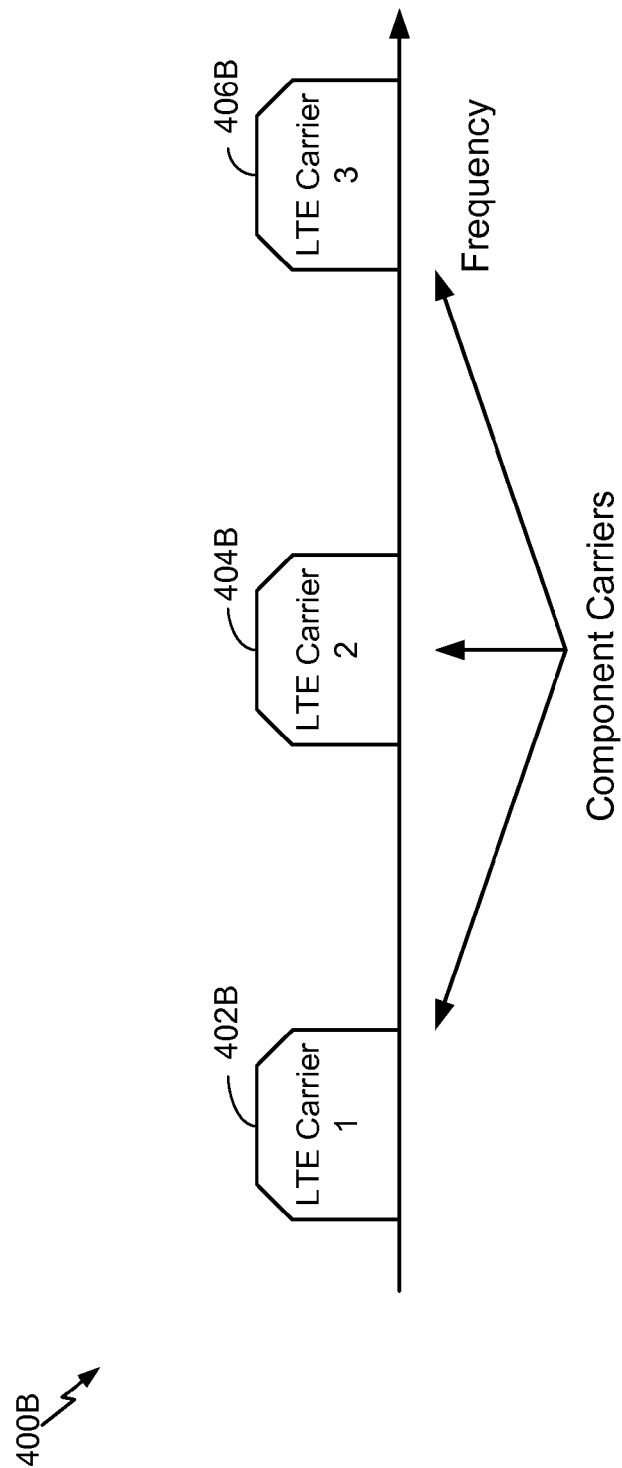
FIG. 4B illustrates a non-continuous carrier aggregation type, in accordance with aspects of the present disclosure.

For LTE-Advanced mobile systems, two types of carrier aggregation (CA) methods have been proposed, continuous CA and non-continuous CA, which are illustrated in FIGS. 4A and 4B.

FIG. 4A illustrates an example of continuous CA 400A, according to aspects of the present disclosure. Continuous CA occurs when multiple available component carriers 402A, 404A, and 406A are adjacent to each other, as illustrated in FIG. 4A.

FIG. 4B illustrates an example of non-continuous CA 400B, according to aspects of the present disclosure. Non-continuous CA occurs when multiple available component carriers 402B, 404B, and 406B are separated along the frequency band, as illustrated in FIG. 4B. Both non-continuous and continuous CA aggregate multiple LTE/component carriers to serve a single unit of LTE Advanced UE.

Multiple RF receiving units and multiple FFTs may be deployed with non-continuous CA in LTE-Advanced UE since the carriers are separated along the frequency band. Because non-continuous CA supports data transmissions over multiple separated carriers across a large frequency range, propagation path loss, Doppler shift and other radio channel characteristics may vary a lot at different frequency bands.

Thus, to support broadband data transmission under the non-continuous CA approach, methods may be used to adaptively adjust coding, modulation and transmission power for different component carriers. For example, in an LTE-Advanced system where the eNodeB has fixed transmitting power on each component carrier, the effective coverage or supportable modulation and coding of each component carrier may be different.

Data Aggregation Schemes

Figure 5:
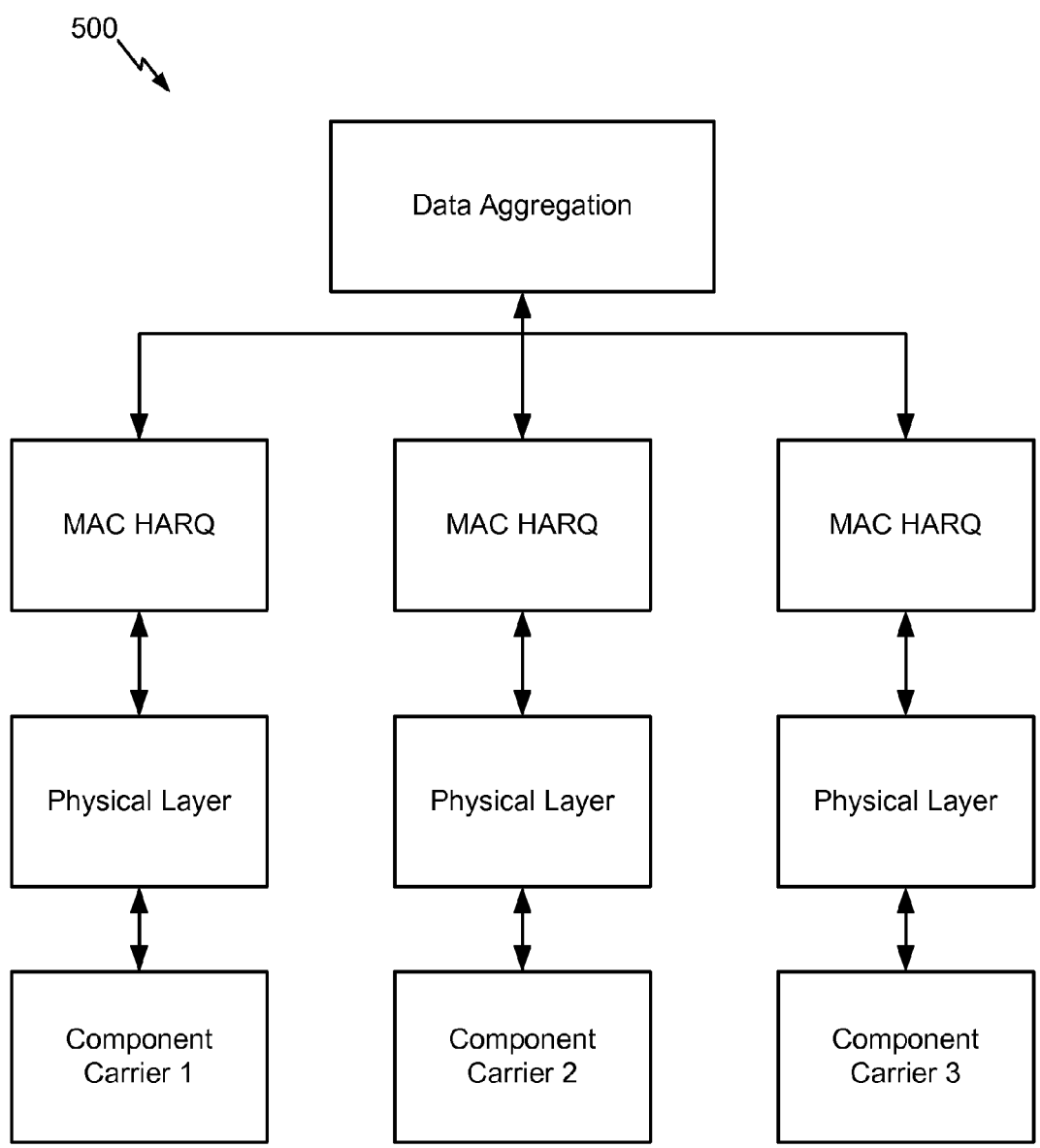
FIG. 5 illustrates MAC layer data aggregation, in accordance with aspects of the present disclosure.

FIG. 5 illustrates aggregating transmission blocks (TBs) 500 from different component carriers at the medium access control (MAC) layer for an IMT-Advanced system, in accordance with aspects of the present disclosure. With MAC layer data aggregation, each component carrier has its own independent hybrid automatic repeat request (HARQ) entity in the MAC layer and its own transmission configuration parameters (e.g., transmitting power, modulation and coding schemes, and multiple antenna configuration) in the physical layer. Similarly, in the physical layer, one HARQ entity is provided for each component carrier.

Control Signaling

In general, there are three different approaches for deploying control channel signaling for multiple component carriers.

The first involves a minor modification of the control structure in LTE systems where each component carrier is given its own coded control channel.

The second method involves jointly coding the control channels of different component carriers and deploying the control channels in a dedicated component carrier. The control information for the multiple component carriers will be integrated as the signaling content in this dedicated control channel. As a result, backward compatibility with the control channel structure in LTE systems is maintained, while signaling overhead in the CA is reduced.

The third method involves jointly coding multiple control channels for different component carriers and then transmitting over the entire frequency band. This approach offers low signaling overhead and high decoding performance in control channels, at the expense of high power consumption at the UE side. However, this method is not compatible with LTE systems.

Handover Control

Handover occurs when a UE 120 moves from one cell 102, covered by a first eNodeB 110, into another cell 102 covered by a second eNodeB. It is preferable to support transmission continuity during the handover procedure across multiple cells when CA is used for IMT-Advanced UE. However, reserving sufficient system resources (i.e., component carriers with good transmission quality) for the incoming UE with specific CA configurations and quality of service (QoS) requirements may be challenging for the next eNodeB. The reason is that the channel conditions of two (or more) adjacent cells (eNodeBs) may be different for the specific UE. In one approach, the UE measures the performance of only one component carrier in each adjacent cell. This offers similar measurement delay, complexity, and energy consumption as that in LTE systems. An estimate of the performance of the other component carriers in the corresponding cell may be based on the measurement result of the one component carrier. Based on this estimate, the handover decision and transmission configuration may be determined.

According to various embodiments, the UE operating in a multicarrier system (also referred to as carrier aggregation) is configured to aggregate certain functions of multiple carriers, such as control and feedback functions, on the same carrier, which may be referred to as a "primary carrier." The remaining carriers that depend on the primary carrier for support are referred to as associated secondary carriers. For example, the UE may aggregate control functions such as those provided by the optional dedicated channel (DCH), the nonscheduled grants, a physical uplink control channel (PUCCH), and/or a physical downlink control channel (PDCCH). Signaling and payload may be transmitted both on the downlink by the eNodeB to the UE, and on the uplink by the UE to the eNodeB.

In some embodiments, there may be multiple primary carriers. In addition, secondary carriers may be added or removed without affecting the basic operation of the UE, including physical channel establishment and radio link failure (RLF) procedures which are layer 2 procedures, such as in the 3GPP technical specification 36.331 for the LTE RRC protocol.

Figure 6:
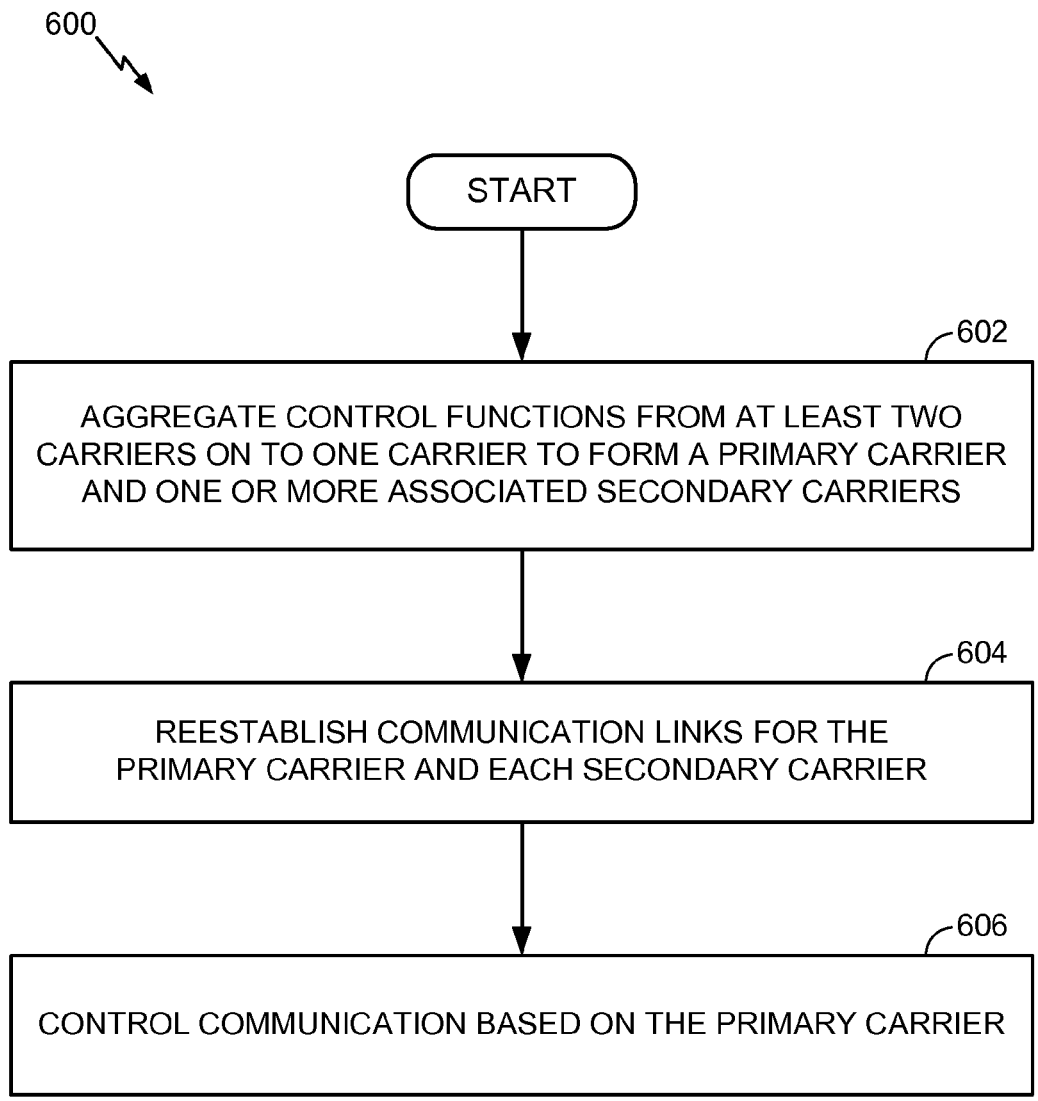
FIG. 6 is a block diagram illustrating a method for controlling radio links in multiple carrier configurations, in accordance with aspects of the present disclosure.

FIG. 6 illustrates a method 600 for controlling radio links in a multiple carrier wireless communication system by grouping physical channels according to one example. As shown, the method includes, at block 602, aggregating control functions from at least two carriers onto one carrier to form a primary carrier and one or more associated secondary carriers. Next, at block 604, communication links are established for the primary carrier and each secondary carrier. Then, communication is controlled based on the primary carrier at block 606.

Structure of e-PDCCH in LTE

Many motivations exist for an enhanced physical downlink control channel (e-PDCCH) in LTE. For example, e-PDCCH may improve carrier aggregation (CA) enhancements, help support new carriers which may not be backwards compatible, reduce control channel capacity limitations of coordinated multipoint (CoMP) transmissions, and enhance DL MIMO.

According to aspects of the present disclosure, an e-PDCCH may support increased control channel capacity and frequency-domain Inter Cell Interference Coordination (ICIC). e-PDCCH may achieve improved spatial reuse of control channel resources. As well, the e-PDCCH may support beamforming and/or diversity, operate on new carrier types and in Multicast-Broadcast Single Frequency Network (MBSFN) subframes, and may coexist on the same carrier as legacy UEs. The e-PDCCH may be scheduled in a frequency-selective manner and may mitigate inter-cell interference.

Figure 7:
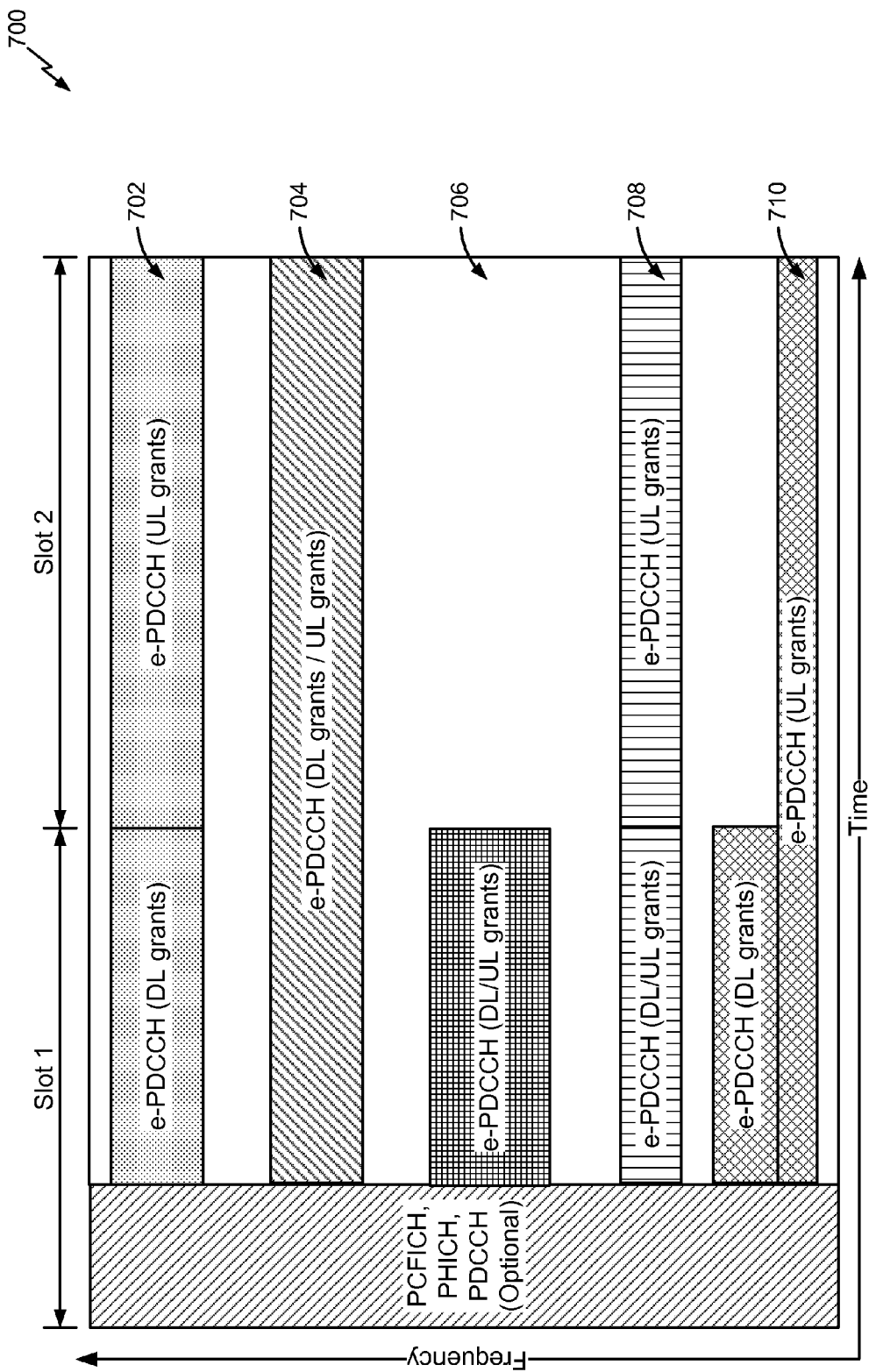
FIG. 7 illustrates possible structures for transmission of e-PDCCH, in accordance with aspects of the present disclosure.

FIG. 7 illustrates possible structures for e-PDCCH 700, according to aspects of the present disclosure. As will be described in more detail below, aspects presented herein provide various schemes for e-PDCCH placement, including: placement the same as R-PDCCH, a pure-frequency division multiplexing (FDM) scheme, a time division multiplexing (TDM) scheme, placement similar to a R-PDCCH (e.g., R-PDCCH-like scheme, with e-PDCCH DL in a first slot and e-PDCCH UL in either the first or second slot), and a hybrid TDM and FDM scheme.

According to a first alternative, 702, the e-PDCCH may be transmitted similarly to transmission of the R-PDCCH, wherein DL grants may be transmitted in a first slot and UL grants may be transmitted in a second slot. According to aspects, the second slot may be used for downlink data transmission if the second slot is not being used for the transmission of uplink grants.

According to a second alternative, 704, the e-PDCCH may be transmitted in a pure FDM scheme, wherein DL grants and UL grants span the resource block (RBs). As shown, a set of resources in the frequency domain are allocated for transmission of e-PDCCH across a time domain comprising a first time slot and a second time slot. According to certain aspects, a subset of RBs multiplexed in the frequency domain with PDSCH are allocated for transmitting e-PDCCH including both uplink and downlink grants across the first and second time slots.

According to a third alternative, 706, the e-PDCCH may be transmitted in a first slot according to a TDM scheme, wherein DL and UL grants are transmitted in a first slot. As illustrated, the remaining RBs may be utilized for transmitting the PDSCH data transmissions.

According to a fourth alternative, 708, the e-PDCCH may be transmitted in a manner similar to R-PDCCH, wherein DL and UL grants may be transmitted in a first slot and UL grants may be transmitted in a second slot. According to certain aspects, if a DL grant is transmitted in a first PRB of a given PRB pair, then an UL grant may be transmitted in a second PRB of the PRB pair. Otherwise, an UL grant may be transmitted in either the first or second PRB of the PRB pair.

According to a fifth alternative, 710, the e-PDCCH may be transmitted using TDM for DL grants in a first slot and FDM for UL grants spanning a first and second slot.

As illustrated at 702, transmitting the e-PDCCH in a manner similar to the R-PDCCH may enable early decoding. Additionally, such placement may allow multiplexing PDCCH and PDSCH in the same PRB and provide favorable resource granularity.

Transmitting e-PDCCH in a manner similar to R-PDCCH as illustrated at 702 may provide limited beamforming gains and may introduce resource wastage. Resources may be wasted, for example, when only an UL grant exists in a PRB pair. When an UL grant is present in a second slot of a PRB pair and a downlink grant is not present in the first slot of the PRB pair, the first slot may not be used for DL data transmission. According to aspects, the first slot may not carry the PDSCH.

Transmitting e-PDCCH in a manner similar to R-PDCCH may result in asymmetric capacity for DL and UL grants. This may not present an issue for new carrier types, since capacity may be more or less symmetric, because the starting symbol of the first slot for e-PDCCH may be zero. Additionally, this may not be an issue for low cost machine type communication (MTC) devices, since traffic may be UL heavy.

As illustrated at 704, the e-PDCCH may be transmitted in a pure-FDM scheme. Such transmission may allow multiplexing between e-PDCCH and PDSCH and improved beamforming gains. According to a colliding antenna port example, the PDCCH and PDSCH may share the same PRB pair, but may use different antenna ports. For example, PDSCH may use antenna ports 7, 8, 9, and 10 (rank 4 transmission) for DL grants. In PRB pair x, for example, e-PDCCH may use port 7 while PDSCH may use ports 8, 9, and 10.

According to a non-colliding antenna port example, PDSCH may use port 8, for example, for both DL and UL grants. In PRB pair x, e-PDCCH may use port 7, while PDSCH may use port 8. In other PRB pairs, the PDSCH may use port 8.

However, processing delays may result by transmitting the e-PDCCH in a pure-FMD scheme, because PDCCH is typically transmitted in the first few control symbols. Once a UE has decoded the PDCCH, it may begin to decode PDSCH immediately. As illustrated at 704, the UE may have to wait until the end of the subframe to decode the e-PDCCH. As it may take some time for the UE to decode the e-PDCCH, the decoding of the data channel may begin some time after the end of the subframe. Accordingly, this transmission scheme may become more favorable as long as early decoding is possible.

According to aspects, the early decoding issues may be alleviated by limiting the transport block size (TBS) and/or the number of blind decodes. As will be described in more detail below, coarse resource granularity (one RB may be around 100 REs) may exist when multi-user (MU)-MIMO is supported for e-PDCCH, and only large downlink control information (DCI) sizes are supported.

As illustrated at 706, the e-PDCCH may be transmitted according to a TDM scheme. Because DL and UL grants may be transmitted in the first slot, such a transmission may allow early decoding benefits. Additionally, transmission according to a TDM scheme may allow better resource granularity (one RB may be roughly 30-60 REs).

According to aspects, for TDM based approaches for transmitting e-PDCCH, the division point may not necessarily be the slot boundary. This may improve balancing capacity of DL grants and UL grants.

However, e-PDCCH transmission according to a TDM scheme may provide limited beamforming gain. As well, there may be possible resource wastage or TDM based PDCCH/PDSCH multiplexing, especially when the first slot is used for UL grants.

As illustrated at 708, the e-PDCCH may be transmitted in a manner similar to R-PDCCH. Such transmission may enable early decoding. Additionally, transmitting e-PDCCH in a manner similar to R-PDCCH may allow PDCCH and PDSCH multiplexing in the same PRB pair, favorable resource granularity, and improved resource usage. According to aspects, PDCCH pruning (false alarm handling) may be performed by using both of the slots for UL grants, possibly combined with DL grants.

Using a format similar to transmission of R-PDCCH for e-PDCCH may allow limited beamforming gain, asymmetric capacity for DL and UL grants (UL heavy capacity), and resources may be wasted when the number of stand alone UL grants are not even.

As illustrated at 710, using a hybrid TDM DL grant and FDM UL grant for transmitting e-PDCCH may enable early decoding while providing improved resource usage. As well, transmitting the e-PDCCH in such a manner may provide a favorable resource granularity for DL grants. According to aspects, the hybrid approach may involve a fewer number of blind decodes, as compared to other options, since DL and UL grants are separate. Accordingly, PDCCH pruning may need to consider both DL and UL grants when allocated resources for the grants overlap. According to aspects, DCI format 0 may not be supported in the common search space. Thus, the common search space, located in the first slot, may only carry DL grants.

However, such a hybrid approach for e-PDCCH transmission may provide limited beamforming gain for DL grants. The hybrid approach for e-PDCCH may handle PDCCH for DL grants and PDSCH multiplexing in the same PRB pair and may provide coarse resource granularity for UL grants. According to aspects, course resource granularity may be alleviated by MU-MIMO, power control, etc.

According to aspects, FDM-based transmissions with fine resource granularity may be a desirable structure for transmitting e-PDCCH. This is because using one RB (comprising approximately 100 REs in typical subframes) as a minimal resource unit for e-PDCCH construction may be too much. For example, a control channel element (CCE), the minimum resource unit for legacy PDCCH, is 36 REs. Thus, FIGS. 8-10 illustrate three design alternatives for transmission of e-PDCCH with finer granularity, according to aspects of the present disclosure. In FIGS. 8-10, REs 802, 804, and 806 of the same CCE for e-PDCCH are illustrated. REs 808 are not available for e-PDCCH transmission.

FIG. 8 illustrates an example MU-MIMO alternative 800 according to aspects of the present disclosure. As illustrated, one resource block may multiplex e-PDCCH for several users. Although three REs of the same CCE for e-PDCCHs 802, 804, and 806 are illustrated, any number of users and e-PDCCHs, including two, four, or more, may be possible. In FIG. 8, different beams or layers may be used to separate the e-PDCCH transmissions for each users.

FIG. 9 illustrates an example of finer granularity using a subset of consecutive tones 900 in the PRB pair as the minimum unit. As illustrated, four consecutive tones in the PRB pair may be used as the minimum unit. Thus, the RB may multiplex three e-PDCCHs. Four tones may work naturally with the current demodulation reference signal (DM-RS) patterns, where within each RB, with 12 tones, there are 3 looks of DM-RS REs in the frequency domain. Four tones may also make it possible to better align the minimum resource unit (CCE, 36 REs) for legacy PDCCH with the minimum resource unit for e-PDCCH. The number of REs for 4 tones in the PRB pair is roughly on the order of 30-40 REs. The number of REs per e-PDCCH decoding candidate may still be different, for example, depending on the CRS, or channel state information-reference signal (CSI-RS) configurations, the number of symbols available to e-PDCCH (e.g., DwPTS in TDD), and the CP type (normal CP vs. extended CP). Alternatively or additionally, in some special subframes, for example, subframes containing CSI-RS with all or certain configurations (e.g., when the number of CSI-RS REs exceeds a certain threshold) or downlink pilot time slot (DwPTS) with all or certain configurations in TDD systems, instead of a 4-tone split, a different number of consecutive tones may be considered such that the number of REs in a minimum resource unit in these special subframes is comparable to that of the minimum resource unit in other subframes. A UE can be informed of such differences via signaling.

FIG. 10 illustrates an example of finer granularity using a subset of interleaved tones 1000 in the PRB pair as the minimum resource unit. The DM-RS pattern may be assumed to be rank 4 pattern, for example, multiplexing capability of 4 UEs. According to aspects, the actual multiplexing capability may be further limited, e.g., 3. Thus, a UE may transmit a demodulation reference signal to an eNB according to a pattern independent of the rank detected by the UE. According to aspects, the UE may transmit a demodulation reference signal with a pattern corresponding to a maximum possible rank regardless of a number of e-PDCCH transmitted by the eNB.

Alternatively, at least in special subframes, for example, subframes containing CSI-RS, the DM-RS pattern may be configurable to be either rank 2 or rank 4 patterns. Each DM-RS port and the associated REs may consist of one e-PDCCH decoding candidate. Alternatively or additionally, in some special subframes, for example, subframes containing CSI-RS with all or certain configurations (e.g., when the number of CSI-RS REs exceeds a certain threshold) or DwPTS with all or certain configurations in TDD systems, instead of a maximum multiplexing capability of 4 UEs, a different multiplexing capability (e.g., 2 UEs) may be considered such that the number of resource elements in a minimum resource unit in these special subframes is comparable to that of the minimum resource unit in other subframes. A UE can be informed of such differences via signaling.

According to aspects, the cycling of the available of REs may follow a time-first, frequency-second manner (e.g., mapping of e-PDCCH may be first by time and then by frequency). Alternatively, the cycling of the available REs follow a frequency-first, time-second manner (e.g., mapping of e-PDCCH may be first by frequency and then by time). The cycling may be done on a per RB basis or on a per PRB pair basis. The latter may be preferable, since the availability of REs for e-PDCCH may be different in the two RBs of the same PRB pair (e.g., CSI-RS may be located in the second slot, but not the first).

According to aspects, divisions may not be fixed across all subframes. For example, if a subframe contains CSI-RS, a number of REs may be reserved for CSI-RS, thus limiting the availability of resources for transmission of e-PDCCH. As an example, in a special subframe in TDD, the DwPTS may be configured to have a certain number of symbols (e.g., 9, 10, 11, 12), the number of REs available for e-PDCCH can be less than a regular downlink subframe. Accordingly, these subframes may use a different multiplexing scheme, or different multiplexing capabilities.

According to some aspects, the divisions may be done differently for a subframe with an extended cyclic prefix (CP), as compared to a subframe with a normal CP. This is because that the availability of REs for e-PDCCH can be different in these two cases.

After establishing a minimum construction unit, aggregation levels may need to be mapped to CCE units. As in the legacy PDCCH case, a UE may be configured to monitor 4 possible levels, 1 CCE, 2 CCEs, 4 CCEs, and 8 CCEs. According to aspects, the CCEs may be mapped to the same PRB, and the same PRG to the extent possible. In particular, for e-PDCCH transmission similar to FDM, when finer granularity is adopted such that each PRB pair can multiplex two or more e-PDCCH CCEs, for e-PDCCH aggregation level greater than 1, one e-PDCCH may be mapped to one RB to the extent possible.

Two or more RBs may have the same precoding, referred to as a precoding RB group (PRG). According to aspects, one e-PDCCH may mapped to the same PRG (e.g., PRB bundling) as much as possible.

Figure 11:
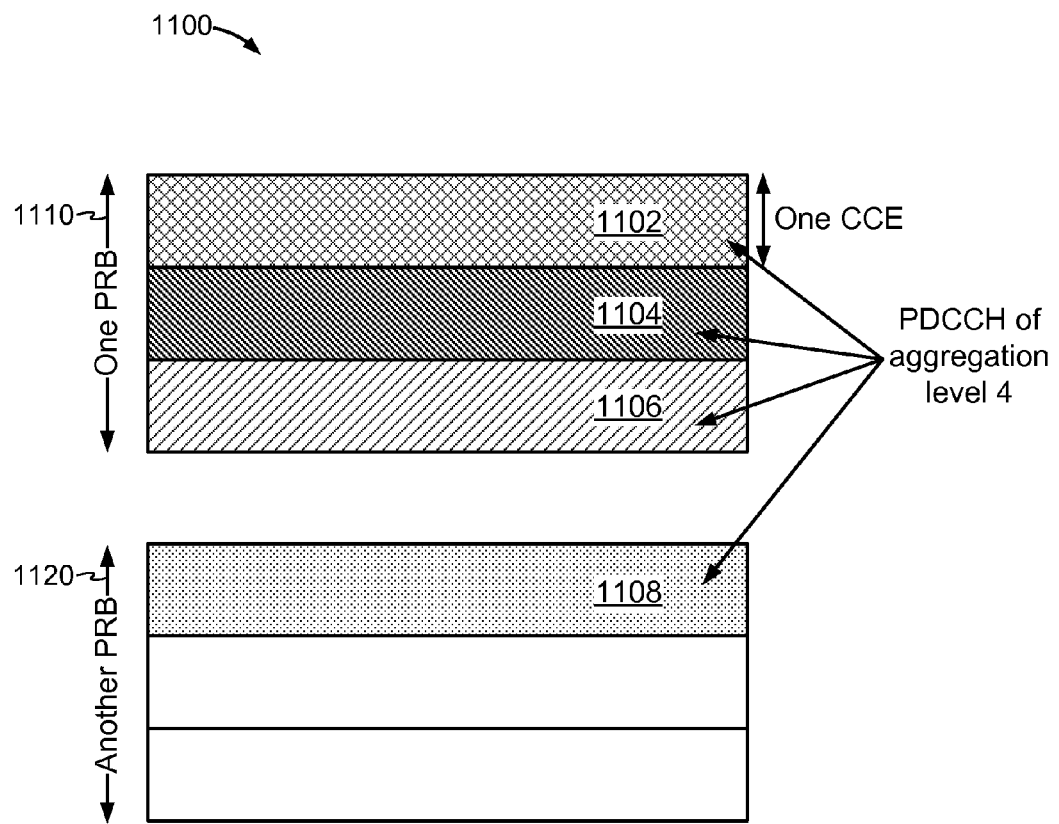
FIG. 11 illustrates mapping CCEs, in accordance with aspects of the present disclosure.

FIG. 11 illustrates an example aggregation level mapping to CCE mapping 1100, according to aspects of the present disclosure. As illustrated, e-PDCCH may be transmitted according to a level 4 transmission. CCEs 1102, 1104, and 1106 may be mapped to the same RB 1110 and CCE 1108 may be mapped, if possible, to another RB 1120 of the same PRG of the first RB 1110.

Figure 12:
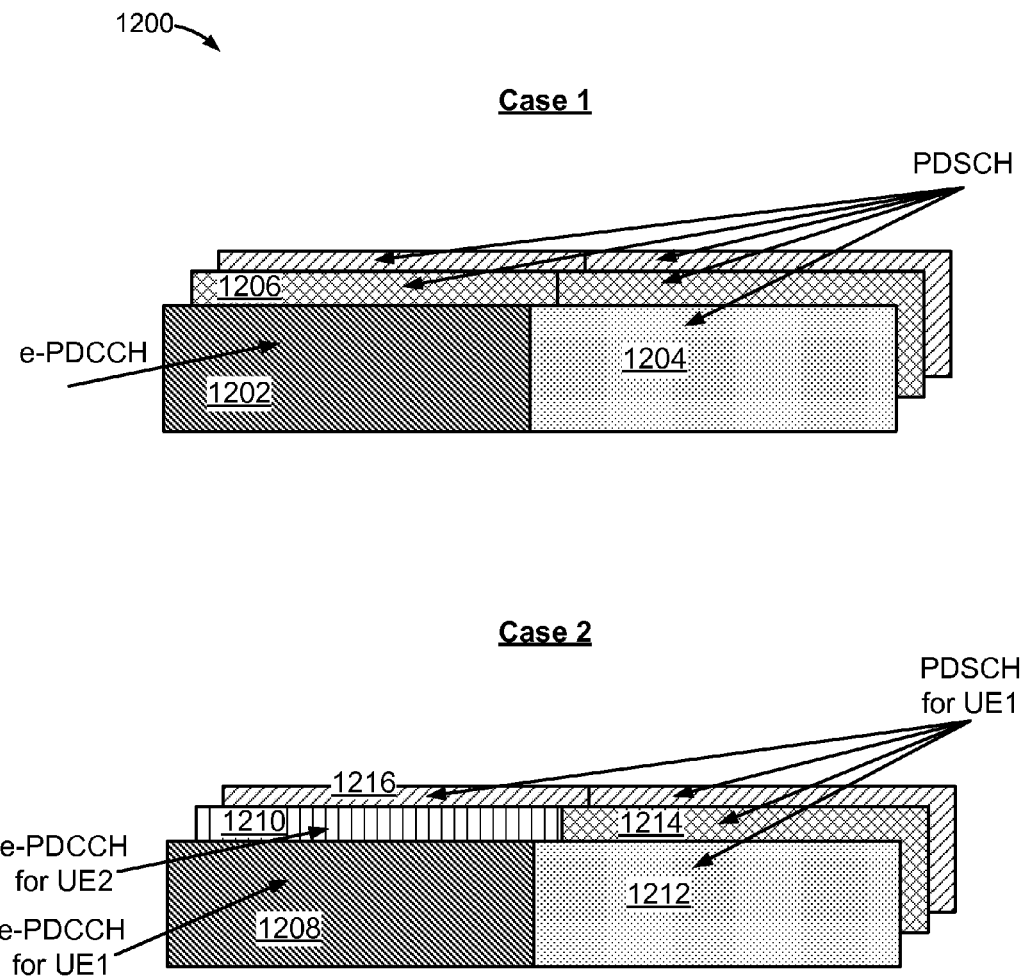
FIG. 12 illustrates example interactions between e-PDCCH and PDSCH, in accordance with aspects of the present disclosure.

FIG. 12 illustrates example interactions 1200 between e-PDCCH and PDSCH according to aspects of the present disclosure. A UE should be able to determine ports for scheduled PDSCH in an overlapping region of e-PDCCH and PDSCH transmission. For example, the UE should be capable of determining ports for scheduled PDSCH, regardless of whether the e-PDCCH is transmitted according to a FDM or TDM approach. When a UE detects an e-PDCCH with antenna port x that schedules PDSCH with antenna port set S with resources at least partially overlapping with the e-PDCCH (in terms of PRB pair), the UE should be able determine ports for the scheduled PDSCH. According to aspects, a pure discounting of port x from the port set S may not work in all aspects.

As shown in FIG. 12, case 1 illustrates that an antenna port, for example port 7 may be dedicated for e-PDCCH and port 8 may be used for PDSCH. Thus, e-PDCCH and PDSCH may use the same PRB pair and different antenna ports. As illustrated one user may use the first slot for e-PDCCH 1202, and the scheduled PDSCH for the user may be transmitted using the second slot 1204. The user may use a first slot, for example, 1206 for PDSCH, using a different antenna port. Case 2 of FIG. 12 illustrates two UEs receiving e-PDCCH in a first slot 1208, 1210, while the PDSCH for UE 1 is scheduled in the second slots 1212, 1214 and may occupy a first slot 1216 using another port.

According to aspects, special handling may exist for e-PDCCH in DwPTS. For TDM based e-PDCCH transmission, a very small number of symbols may be left for PDSCH in the second slot in some special subframe configurations. For example, PDSCH may be transmitted in special subframes with configurations 1/2/3/4/6/7/8, with 9, 10, 11, or 12 OFDM symbols for the normal CP. This implies that there may be 2, 3, 4, and 5 OFDM symbols in the second slot. Limited resources may be available in subframes with extended CP as well. In R-PDCCH design, this was not an issue, since special subframe was not part of backhaul transmission.

However, for e-PDCCH, special rules may apply for multiplexing e-PDCCH and PDSCH in the same PRB pair for some subframe configurations. If, for example, the number of symbols in the second slot is very small, for example three or less, PDSCH may not be enabled. In some cases, e-PDCCH transmitted according to a TDD scheme may be extended to utilize the entire DwPTS portion for the control transmission. If the e-PDCCH is transmitted using an FDM approach, special subframes may use different multiplexing schemes as previously described, in an effort to improve e-PDCCH operations.

Figure 13:
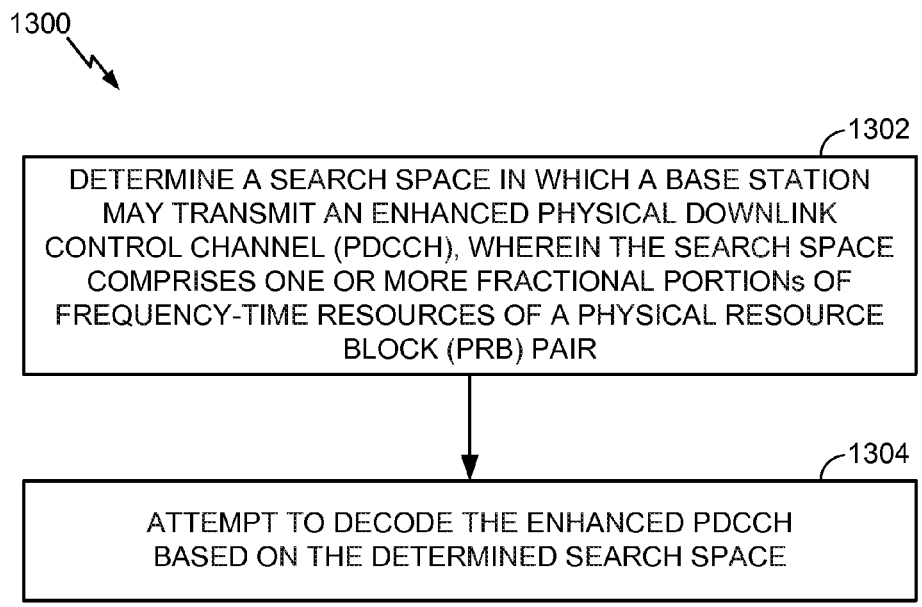
FIG. 13 illustrates example operations which may be performed, for example, by a UE, in accordance with aspects of the present disclosure.

FIG. 13 illustrates example operations 1300 which may be performed, for example, by a user equipment, according to aspects of the present disclosure. At 1302, a UE may determine a search space in which a base station may transmit an enhanced physical downlink control channel (e-PDCCH), wherein the search space comprises one or more fractional portions of frequency-time resources of a physical resource block (PRB) pair. At 1304, the UE may attempt to decode the e-PDCCH based on the determined search space.

As previously described, according to aspects, the fractional portion of resources may comprise frequency division multiplexed resources. The fractional portion of resources may comprise interleaved tones. Each fractional portion of resources may be associated with an antenna port for demodulation.

The multiplexing capability for an e-PDCCH in a PRB pair may depend on a subframe type. For example, for a subframe containing channel station information—reference signal (CSI-RS) or downlink pilot time slot (DwPTS), the multiplexing capability may be smaller than that of a regular downlink subframe. The multiplexing capability for an e-PDCCH in a PRB pair may be smaller when a number of resource elements (REs) used for e-PDCCH is below a threshold. Multiplexing of an e-PDCCH in a PRB pair with an extended cyclic prefix may be smaller than that of a PRB pair with a normal cyclic prefix.

Figure 14:
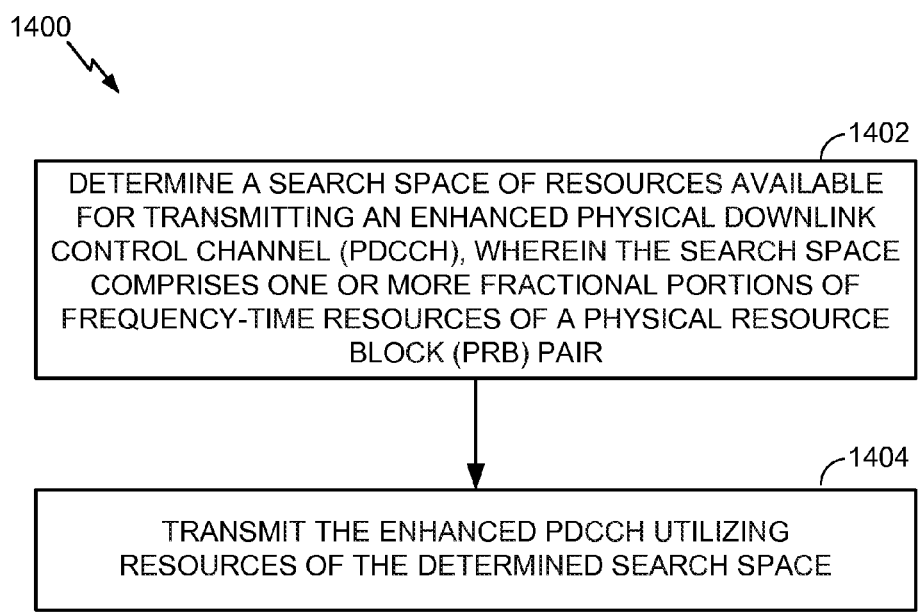
FIG. 14 illustrates example operations which may be performed, for example, by a BS, in accordance with aspects of the present disclosure.

FIG. 14 illustrates example operations 1400 which may be performed, for example, by a base station, according to aspects of the present disclosure. At 1402, a base station may determine a search space of resources available for transmitting an enhanced physical downlink control channel (e-PDCCH), wherein the search space comprises one or more fractional portions of frequency-time resources of a physical resource block (PRB) pair. At 1404, the base station may transmit the e-PDCCH utilizing resources of the determined search space.

According to aspects, the fractional portion comprises frequency division multiplexed resources. In another alternative, the fractional portion of resources comprises interleaved tones. As described herein, the base station may receive a demodulation reference signal with a pattern corresponding to a maximum possible rank, regardless of a number of e-PDCCH transmitted in the physical resource block pair.

The multiplexing capability for an e-PDCCH in a PRB pair may depend on a subframe type. For example, for a subframe containing channel station information—reference signal (CSI-RS) or downlink pilot time slot (DwPTS), the multiplexing capability may be smaller than that of a regular downlink subframe. The multiplexing capability for an e-PDCCH in a PRB pair may be smaller when a number of resource elements (REs) used for e-PDCCH is below a threshold. Multiplexing of an e-PDCCH in a PRB pair with an extended cyclic prefix may be smaller than that of a PRB pair with a normal cyclic prefix.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications, comprising:
    determining a search space in which a base station may transmit an enhanced physical downlink control channel (e-PDCCH), wherein the search space comprises one or more fractional portions of frequency-time resources of a physical resource block (PRB) pair; and
    attempting to decode the e-PDCCH based on the determined search space,
    wherein a multiplexing capability for the e-PDCCH in the PRB pair depends on a subframe type.

2. The method of claim 1, wherein the fractional portion of resources comprises frequency division multiplexed resources.

3. The method of claim 1, wherein the fractional portion of resources comprises interleaved tones.

4. The method of claim 1, further comprising:
    transmitting a demodulation reference signal (DM-RS) with a pattern corresponding to a maximum possible rank regardless of a number of e-PDCCH transmitted in the PRB pair.

5. The method of claim 1, wherein each fractional portion of frequency-time resources is associated with an antenna port for demodulation.

6. The method of claim 1, wherein a mapping of e-PDCCH to the one or more fractional portions of frequency-time resources follows a frequency-first, time-second manner.

7. The method of claim 1, wherein for a subframe containing channel state information-reference signal (CSI-RS) or downlink pilot time slot (DwPTS), the multiplexing capability is smaller than that of a regular downlink subframe.

8. The method of claim 7, wherein the multiplexing capability is smaller when a number of resource elements (REs) for e-PDCCH is below a threshold.

9. The method of claim 1, wherein the multiplexing capability of an e-PDCCH in a PRB pair with an extended cyclic prefix is smaller than that of a PRB pair with a normal cyclic prefix.

10. An apparatus for wireless communications, comprising:
    means for determining a search space in which a base station may transmit an enhanced physical downlink control channel (e-PDCCH), wherein the search space comprises one or more fractional portions of frequency-time resources of a physical resource block (PRB) pair; and means for attempting to decode the e-PDCCH based on the determined search space, wherein a multiplexing capability for an e-PDCCH in the PRB pair depends on a subframe type.

11. The apparatus of claim 10, wherein the fractional portion of resources comprises frequency division multiplexed resources.

12. The apparatus of claim 10, wherein the fractional portion of resources comprises interleaved tones.

13. The apparatus of claim 10, further comprising:

means for transmitting a demodulation reference signal (DM-RS) with a pattern corresponding to a maximum possible rank regardless of a number of e-PDCCH transmitted in the PRB pair.

14. The apparatus of claim 10, wherein each fractional portion of frequency-time resources is associated with an antenna port for demodulation.

15. The apparatus of claim 10, wherein a mapping of e-PDCCH to the one or more fractional portions of frequency-time resources follows a frequency-first, time-second manner.

16. The apparatus of claim 10, wherein for a subframe containing channel state information-reference signal (CSI-RS) or downlink pilot time slot (DwPTS), the multiplexing capability is smaller than that of a regular downlink subframe.

17. The apparatus of claim 16, wherein the multiplexing capability is smaller when a number of resource elements (REs) for e-PDCCH is below a threshold.

18. The apparatus of claim 10, wherein the multiplexing capability of an e-PDCCH in a PRB pair with an extended cyclic prefix is smaller than that of a PRB pair with a normal cyclic prefix.

19. An apparatus for wireless communications, comprising:

at least one processor configured to:
determine a search space in which a base station may transmit an enhanced physical downlink control channel (e-PDCCH), wherein the search space comprises one or more fractional portions of frequency-time resources of a physical resource block (PRB) pair; and
attempt to decode the e-PDCCH based on the determined search space; and
a memory coupled to the at least one processor,
wherein a multiplexing capability for an e-PDCCH in the PRB pair depends on a subframe type.

20. The apparatus of claim 19, wherein the fractional portion of resources comprises frequency division multiplexed resources.

21. The apparatus of claim 19, wherein the fractional portion of resources comprises interleaved tones.

22. The apparatus of claim 19, wherein the at least one processor is further configured to:

transmit a demodulation reference signal (DM-RS) with a pattern corresponding to a maximum possible rank regardless of a number of e-PDCCH transmitted in the PRB pair.

23. The apparatus of claim 19, wherein each fractional portion of frequency-time resources is associated with an antenna port for demodulation.

24. The apparatus of claim 19, wherein a mapping of e-PDCCH to the one or more fractional portions of frequency-time resources follows a frequency-first, time-second manner.

25. The apparatus of claim 19, wherein for a subframe containing channel state information-reference signal (CSI-RS) or downlink pilot time slot (DwPTS), the multiplexing capability is smaller than that of a regular downlink subframe.

26. The apparatus of claim 25, wherein the multiplexing capability is smaller when a number of resource elements (REs) for e-PDCCH is below a threshold.

27. The apparatus of claim 19, wherein the multiplexing capability of an e-PDCCH in a PRB pair with an extended cyclic prefix is smaller than that of a PRB pair with a normal cyclic prefix.

28. A computer-program product for wireless communications, the computer-program product comprising a non-transitory computer-readable medium having code stored thereon, the code executable by one or more processors for:

determining a search space in which a base station may transmit an enhanced physical downlink control channel (e-PDCCH), wherein the search space comprises one or more fractional portions of frequency-time resources of a physical resource block (PRB) pair; and
attempting to decode the e-PDCCH based on the determined search space,
wherein a multiplexing capability for an e-PDCCH in the PRB pair depends on a subframe type.

29. The computer-program product of claim 28, wherein the fractional portion of resources comprises frequency division multiplexed resources.

30. The computer-program product of claim 28, wherein the fractional portion of resources comprises interleaved tones.

31. The computer-program product of claim 28, further comprising code for:

transmitting a demodulation reference signal (DM-RS) with a pattern corresponding to a maximum possible rank regardless of a number of e-PDCCH transmitted in the PRB pair.

32. The computer-program product of claim 28, wherein each fractional portion of frequency-time resources is associated with an antenna port for demodulation.

33. The computer-program product of claim 28, wherein a mapping of e-PDCCH to the one or more fractional portions of frequency-time resources follows a frequency-first, time-second manner.

34. The computer-program product of claim 28, wherein for a subframe containing channel state information-reference signal (CSI-RS) or downlink pilot time slot (DwPTS), the multiplexing capability is smaller than that of a regular downlink subframe.

35. The computer-program product of claim 34, wherein the multiplexing capability is smaller when a number of resource elements (REs) for e-PDCCH is below a threshold.

36. The computer-program product of claim 28, wherein the multiplexing capability of an e-PDCCH in a PRB pair with an extended cyclic prefix is smaller than that of a PRB pair with a normal cyclic prefix.

37. A method for wireless communications, comprising:

determining a search space of resources available for transmitting an enhanced physical downlink control channel (e-PDCCH), wherein the search space comprises one or more fractional portions of frequency-time resources of a physical resource block (PRB) pair; and
transmitting the e-PDCCH utilizing resources of the determined search space,
wherein a multiplexing capability for an e-PDCCH in the PRB pair depends on a subframe type.

38. The method of claim 37, wherein the fractional portion of resources comprises frequency division multiplexed resources.

39. The method of claim 37, wherein the fractional portion of resources comprises interleaved tones.

40. The method of claim 37, further comprising:
receiving a demodulation reference signal (DM-RS) with a pattern corresponding to a maximum possible rank regardless of a number of e-PDCCH transmitted in the PRB pair.

41. The method of claim 37, wherein each fractional portion of frequency-time resources is associated with an antenna port for demodulation.

42. The method of claim 37, wherein a mapping of e-PDCCH to the one or more fractional portions of frequency-time resources follows a frequency-first, time-second manner.

43. The method of claim 37, wherein for a subframe containing channel state information-reference signal (CSI-RS) or downlink pilot time slot (DwPTS), the multiplexing capability is smaller than that of a regular downlink subframe.

44. The method of claim 43, wherein the multiplexing capability is smaller when a number of resource elements (REs) for e-PDCCH is below a threshold.

45. The method of claim 37, wherein the multiplexing capability of an e-PDCCH in a PRB pair with an extended cyclic prefix is smaller than that of a PRB pair with a normal cyclic prefix.

46. An apparatus for wireless communications, comprising:
means for determining a search space of resources available for transmitting an enhanced physical downlink control channel (e-PDCCH), wherein the search space comprises one or more fractional portions of frequency-time resources of a physical resource block (PRB) pair; and
means for transmitting the e-PDCCH utilizing resources of the determined search space,
wherein a multiplexing capability for an e-PDCCH in the PRB pair depends on a subframe type.

47. The apparatus of claim 46, wherein the fractional portion of resources comprises frequency division multiplexed resources.

48. The apparatus of claim 46, wherein the fractional portion of resources comprises interleaved tones.

49. The apparatus of claim 46, further comprising:
means for receiving a demodulation reference signal (DM-RS) with a pattern corresponding to a maximum possible rank regardless of a number of e-PDCCH transmitted in the PRB pair.

50. The apparatus of claim 46, wherein each fractional portion of frequency-time resources is associated with an antenna port for demodulation.

51. The apparatus of claim 46, wherein a mapping of e-PDCCH to the one or more fractional portions of frequency-time resources follows a frequency-first, time-second manner.

52. The apparatus of claim 46, wherein for a subframe containing channel state information-reference signal (CSI-RS) or downlink pilot time slot (DwPTS), the multiplexing capability is smaller than that of a regular downlink subframe.

53. The apparatus of claim 52, wherein the multiplexing capability is smaller when a number of resource elements (REs) for e-PDCCH is below a threshold.

54. The apparatus of claim 46, wherein the multiplexing capability of an e-PDCCH in a PRB pair with an extended cyclic prefix is smaller than that of a PRB pair with a normal cyclic prefix.

55. An apparatus for wireless communications, comprising:
at least one processor configured to:
determine a search space of resources available for transmitting an enhanced physical downlink control channel (e-PDCCH), wherein the search space comprises one or more fractional portions of frequency-time resources of a physical resource block (PRB) pair; and
transmit the e-PDCCH utilizing resources of the determined search space; and
a memory coupled to the at least one processor,
wherein a multiplexing capability for an e-PDCCH in the PRB pair depends on a subframe type.

56. The apparatus of claim 55, wherein the fractional portion of resources comprises frequency division multiplexed resources.

57. The apparatus of claim 55, wherein the fractional portion of resources comprises interleaved tones.

58. The apparatus of claim 55, wherein the at least one processor is further configured to:
receive a demodulation reference signal (DM-RS) with a pattern corresponding to a maximum possible rank regardless of a number of e-PDCCH transmitted in the PRB pair.

59. The apparatus of claim 55, wherein each fractional portion of frequency-time resources is associated with an antenna port for demodulation.

60. The apparatus of claim 55, wherein a mapping of e-PDCCH to the one or more fractional portions of frequency-time resources follows a frequency-first, time-second manner.

61. The apparatus of claim 55, wherein for a subframe containing channel state information-reference signal (CSI-RS) or downlink pilot time slot (DwPTS), the multiplexing capability is smaller than that of a regular downlink subframe.

62. The apparatus of claim 61, wherein the multiplexing capability is smaller when a number of resource elements (REs) for e-PDCCH is below a threshold.

63. The apparatus of claim 55, wherein the multiplexing capability of an e-PDCCH in a PRB pair with an extended cyclic prefix is smaller than that of a PRB pair with a normal cyclic prefix.

64. A computer-program product for wireless communications, the computer-program product comprising a non-transitory computer-readable medium having code stored thereon, the code executable by one or more processors for:
determining a search space of resources available for transmitting an enhanced physical downlink control channel (e-PDCCH), wherein the search space comprises one or more fractional portions of frequency-time resources of a physical resource block (PRB) pair; and
transmitting the e-PDCCH utilizing resources of the determined search space,
wherein a multiplexing capability for an e-PDCCH in the PRB pair depends on a subframe type.

65. The computer-program product of claim 64, wherein the fractional portion of resources comprises frequency division multiplexed resources.

66. The computer-program product of claim 64, wherein the fractional portion of resources comprises interleaved tones.

67. The computer-program product of claim 64, further comprising:
code for receiving a demodulation reference signal (DM-RS) with a pattern corresponding to a maximum possible rank regardless of a number of e-PDCCH transmitted in the PRB pair.

68. The computer-program product of claim 64, wherein each fractional portion of frequency-time resources is associated with an antenna port for demodulation.

69. The computer-program product of claim 64, wherein a mapping of e-PDCCH to the one or more fractional portions of frequency-time resources follows a frequency-first, time-second manner.

70. The computer-program product of claim 64, wherein for a subframe containing channel state information-reference signal (CSI-RS) or downlink pilot time slot (DwPTS), the multiplexing capability is smaller than that of a regular downlink subframe.

71. The computer-program product of claim 70, wherein the multiplexing capability is smaller when a number of resource elements (REs) for e-PDCCH is below a threshold.

72. The computer-program product of claim 64, wherein the multiplexing capability of an e-PDCCH in a PRB pair with an extended cyclic prefix is smaller than that of a PRB pair with a normal cyclic prefix.

* * * * *